Patented Apr. 23, 1935

1,999,093

UNITED STATES PATENT OFFICE 1,999,093

SOLUBLE FUSIBLE RESINS AND PROCESS OF MAKING SAME

Alphonse Gams and Karl Frey, Basel, Switzerland, assignors, by mesne assignments, to the firm of Ciba Products Corporation, Dover, Del.

No Drawing. Application October 16, 1929, Serial No. 400,156. In Switzerland November 12, 1928

8 Claims. (Cl. 260—3)

This invention relates to fusible, soluble synthetic resins from primary aromatic amines and aldehydes. It comprises the process for the manufacture of these resins, the new products themselves, as well as the application of same in the synthetic resin industry.

It is known that by the condensation of primary aromatic amines with more than an equimolecular proportion of an aldehyde, particularly formaldehyde, in presence of an acid and subsequent elimination of the acid, infusible products are obtained.

According to the conditions of working these infusible condensation products are obtained in the form of amorphous powders which can be moulded into artificial masses or as directly moulded masses. They have proved valuable in various branches of the industry concerned with artificial materials (compare specifications Serial No. 245,039, filed January 6, 1928, Nos. 398,267 and 398,268, filed October 8, 1929, No. 400,154, filed October 16, 1929, and No. 166,006, filed February 4, 1927, now Patent 1,939,691.

According to the present invention, the infusible condensation products in question are converted into fusible resins by treating them with a fusible substantially non-hardening resin especially of the type of the synthetic resins obtained by condensation of aldehydes with phenols or aromatic amines, such as for instance, fusible non-hardening phenol-formaldehyde or aniline formaldehyde compounds and the like. It is obvious that instead of the resins themselves also such non-aldehydic resin components may be used which under the conditions of the process, viz. at or below the melting temperature of the mixture, are transformed into fusible non-hardening resins by reacting with the infusible aminealdehyde resin in presence of which they are subjected to the heat treatment and thus act as equivalents of fusible non-hardening synthetic resins. As such non-aldehydic resin components there may be mentioned for instance phenol or aniline. Also other non-hardening resins may be used, such as for instance fusible condensation products of polyvalent alcohols with polybasic acids.

According to the invention, infusible amine-aldehyde condensation products are heated with agents containing resin-forming groups, either by melting a mixture of the infusible component with the fusible component or by introducing the infusible component into the melted fusible component.

In both cases there are produced clear brown-red melts which solidify on cooling to brittle resins resembling colophony. These are fusible and soluble in the usual organic solvents. The softening point and the solubility of the resin depend on the nature of the fusible component and on the proportion of the components to each other.

The resins obtained may be used in molten condition as impregnating agents or they may be applied in molten state in the form of thin layers upon surfaces of any kind. In dissolved form they are useful in the lacquer and varnish industry. Their properties may be affected in various ways by addition of filling agents, dyestuffs, softening agents, agents which impart elasticity, such as artificial resins, oils, rubber or the like.

Obviously the fusible resins can be converted by treating with aldehydes, agents which yield aldehyde or aldehyde condensation products into the infusible and insoluble condition.

The following examples illustrate the invention, the parts being by weight:—

Example 1

100 parts of anhydroformaldehydeaniline are heated to 190° C. and into the yellowish limpid melt are introduced 100 parts of a moulding powder made by condensing 1 mol of aniline with 2 mols of formaldehyde in presence of 1.1 mols of hydrochloric acid and afterwards eliminating the acid (cf. Example 1 of specification Serial No. 245,039). After a short time, a clear deep brown red melt is obtained; this solidifies on cooling to a resin which is soluble in acetone, chloroform and benzene, and softens at 80° C.

Example 2

100 parts of anhydroformaldehydeaniline and 200 parts of a moulding powder made as described in Example 1, are mixed together and the mixture is heated to 200° C., whereupon it becomes a clear brown-red melt. This solidifies on cooling to a brittle resin, which dissolves sparingly in acetone but freely in chloroform, epichlorhydrin or the like; it softens at about 150° C. A solution of this resin, after addition of the usual added materials, is useful as a lacquer.

Example 3

20 parts of an infusible moulding powder, made by condensing 1 mol of anhydroformaldehyeaniline with 0.33 mol of formaldehyde in presence of 1 mol. of hydrochloric acid and then eliminating the acid (cf. specification Serial No. 400,154, example 2) are heated to 160° C., together with 10 parts of phenol, until a clear melt is produced. This solidifies on cooling to a freely soluble resin which softens at 60° C.

100 parts of this resin may be mixed with 10 parts of hexamethylenetetramine and compressed at 150° C. to produce infusible and insoluble moulded pieces.

Example 4

100 parts of sawdust, falling off in the working of a molded body made by compressing an infusible condensation product of aniline and formaldehyde (cf. Example 1 of specification Serial No. 245,039), are introduced into 30 parts of a glycerin-phthalic acid condensation product, heated to 160° C. When cool, the clear brown melt solidifies to a freely soluble resin which softens at about 40° C.

Example 5

50 parts of a liquid phenol formaldehyde condensation product are heated quickly to 160° C. with 20 parts of a moulding powder made as described in Example 1; there is obtained a brown, somewhat turbid melt, which solidifies on cooling to form a resin which softens at 50° C.

The expression "formaldehyde yielding compounds" is employed herein because it has been found that instead of formaldehyde itself also its polymers or any other substance splitting off formaldehyde under the conditions of the condensation may be used.

What we claim is:—

1. As articles of manufacture the fusible soluble resins obtained by reacting an infusible insoluble condensation product of a primary aromatic amine and a formaldehyde yielding compound obtained under acid conditions with a fusible substantially non-hardening primary aromatic amine-aldehyde condensation product.

2. As articles of manufacture the fusible soluble resins obtained by reacting an infusible insoluble condensation product of aniline and formaldehyde obtained under acid conditions with a fusible substantially non-hardening primary aromatic amine-aldehyde condensation product.

3. As articles of manufacture the fusible soluble resins obtained by reacting an infusible insoluble condensation product of a primary aromatic amine and a formaldehyde yielding compound obtained under acid conditions with a compound selected from the following group,—phenol, primary aromatic amines, anhydroformaldehydeaniline, fusible phenol-aldehyde condensation products, fusible condensation products of primary aromatic amines with aldehydes, fusible condensation products of polyvalent alcohols and polybasic acids.

4. As articles of manufacture the fusible soluble resins obtained by reacting an infusible insoluble condensation product of aniline and formaldehyde obtained under acid conditions with a compound selected from the following group,—phenol, primary aromatic amines, anhydroformaldehydeaniline, fusible phenol-aldehyde condensation products, fusible condensation products of primary aromatic amines with aldehydes, fusible condensation products of polyvalent alcohols and polybasic acids.

5. The process of manufacturing fusible soluble resins by reacting an infusible condensation product of a primary aromatic amine and a formaldehyde yielding compound obtained under acid conditions, with a fusible substantially non-hardening synthetic resin of the primary aromatic amine-aldehyde type.

6. The process of manufacturing fusible soluble resins by reacting an infusible condensation product of aniline and formaldehyde obtained under acid conditions, with a fusible substantially non-hardening synthetic resin of the primary aromatic amine-aldehyde type.

7. The process of manufacturing fusible soluble resins by reacting an infusible condensation product of a primary aromatic amine and a formaldehyde yielding compound obtained under acid conditions, with a compound selected from the following group,—phenol, primary aromatic amines, anhydroformaldehydeaniline, fusible phenol-aldehyde condensation products, fusible condensation products of primary aromatic amines with aldehydes, fusible condensation products of polyvalent alcohols and polybasic acids.

8. The process of manufacturing fusible soluble resins by reacting an infusible condensation product of aniline and formaldehyde obtained under acid conditions, with a compound selected from the following group,—phenol, primary, aromatic amines, anhydroformaldehydeaniline, fusible phenol-aldehyde condensation products, fusible condensation products of primary aromatic amines with aldehydes, fusible condensation products of polyvalent alcohols and polybasic acids.

ALPHONSE GAMS.
KARL FREY.